United States Patent
Danilov et al.

(10) Patent No.: US 11,954,537 B2
(45) Date of Patent: Apr. 9, 2024

(54) INFORMATION-UNIT BASED SCALING OF AN ORDERED EVENT STREAM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 517 days.

(21) Appl. No.: 17/237,517

(22) Filed: Apr. 22, 2021

(65) Prior Publication Data

US 2022/0342725 A1 Oct. 27, 2022

(51) Int. Cl.
*G06F 9/54* (2006.01)
*G06F 9/38* (2018.01)
*G06F 11/34* (2006.01)

(52) U.S. Cl.
CPC ............ *G06F 9/542* (2013.01); *G06F 9/3812* (2013.01); *G06F 11/3409* (2013.01); *G06F 11/3447* (2013.01)

(58) Field of Classification Search
None
See application file for complete search history.

(56) References Cited

U.S. PATENT DOCUMENTS

| | | | |
|---|---|---|---|
| 3,617,587 A | 11/1971 | Nayar et al. | |
| 5,826,977 A | 10/1998 | Fowler et al. | |
| 7,107,419 B1 | 9/2006 | Ghemawat et al. | |
| 7,340,690 B2 | 3/2008 | Lau | |
| 7,430,570 B1 | 9/2008 | Srinivasan et al. | |
| 7,610,437 B2 | 10/2009 | Sinclair et al. | |

(Continued)

FOREIGN PATENT DOCUMENTS

| | | |
|---|---|---|
| CA | 2 534 170 A1 | 7/2007 |
| CA | 2672879 | 4/2008 |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Adam Lee
(74) *Attorney, Agent, or Firm* — Amin, Turocy & Watson, LLP

(57) ABSTRACT

Scaling an ordered event stream (OES) based on an information-unit (IU) metric is disclosed. The IU metric can correspond to an amount of computing resources that can be consumed to access information embodied in event data of an event of the OES. In this regard, the amount of computing resources to access the data of the stream event itself can be distinct from an amount of computing resources employed to access information embodied in the data. As such, where an external application, e.g., a reader, a writer, etc., can connect to an OES data storage system, enabling the OES to be scaled in response to burdening of computing resources accessing event information, rather than merely event data, can aid in preservation of an ordering of events accessed from the OES.

20 Claims, 10 Drawing Sheets

(56) References Cited

U.S. PATENT DOCUMENTS

| | | |
|---|---|---|
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer |
| 9,652,307 B1 | 5/2017 | Soman et al. |
| 9,715,434 B1 | 6/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,277,524 B1 * | 4/2019 | Kaitha ............... H04L 65/1046 |
| 10,338,834 B1 | 7/2019 | Dighe et al. |
| 10,338,958 B1 | 7/2019 | Kamboj et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 * | 12/2020 | Evenson ............ G06F 11/3495 |
| 10,867,033 B2 | 12/2020 | Keren et al. |
| 10,891,228 B2 | 1/2021 | Burow |
| 10,909,174 B1 | 2/2021 | Martin et al. |
| 10,929,322 B2 | 2/2021 | McDonald et al. |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0037549 A1 | 2/2008 | Haardt et al. |
| 2008/0059724 A1 | 3/2008 | Stifter Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2013/0290598 A1 | 10/2013 | Fiske et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0270343 A1 * | 9/2014 | Sanaullah ............... H04N 7/147 |
| | | 382/103 |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0091570 A1 * | 3/2017 | Rao ..................... G06V 40/172 |
| 2017/0123655 A1 | 5/2017 | Sinclair et al. |
| 2017/0147494 A1 | 5/2017 | Andre et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2017/0374147 A1 | 12/2017 | McNair et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 * | 6/2018 | Gervais ............... G06F 21/552 |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0046037 A1 | 2/2019 | Ramesh et al. |
| 2019/0057138 A1 | 2/2019 | Knowles et al. |
| 2019/0065246 A1 * | 2/2019 | Senapaty ............... G06F 9/5088 |
| 2019/0129806 A1 | 5/2019 | Hsu et al. |
| 2019/0138494 A1 | 5/2019 | Inoue |
| 2019/0197173 A1 | 6/2019 | Tahara et al. |
| 2019/0220671 A1 * | 7/2019 | Slipenchuk ............ G06F 16/48 |
| 2019/0278849 A1 | 9/2019 | Chandramouli et al. |
| 2019/0327297 A1 | 10/2019 | Madani |
| 2019/0332318 A1 | 10/2019 | Gooding et al. |
| 2019/0340180 A1 | 11/2019 | Barsness et al. |

(56) References Cited

U.S. PATENT DOCUMENTS

| | | | |
|---|---|---|---|
| 2019/0349422 | A1 | 11/2019 | Dhruvakumar et al. |
| 2019/0392866 | A1* | 12/2019 | Yoon ..................... G11B 27/28 |
| 2020/0034468 | A1 | 1/2020 | Lei et al. |
| 2020/0089420 | A1 | 3/2020 | Sharoni et al. |
| 2020/0174695 | A1 | 6/2020 | Bazarsky et al. |
| 2020/0250172 | A1 | 8/2020 | Busjaeger et al. |
| 2020/0274822 | A1* | 8/2020 | Wu ..................... H04L 47/823 |
| 2020/0310686 | A1 | 10/2020 | Truong et al. |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0084318 | A1* | 3/2021 | Kuo ..................... H04N 19/159 |
| 2021/0110328 | A1 | 4/2021 | Hsiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |
| 2022/0248090 | A1* | 8/2022 | Dhiman ............. H04N 21/4318 |
| 2022/0326878 | A1 | 10/2022 | Paduroiu |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#/building-blocks-for-streaming-applications]. The Apache Software Foundation. Copyright 2014-2019, retrieved Aug. 26, 2020, 7 pages.

"What is Apache Flink? - Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 17/127,724, 41 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., ""Efficient selection of access control systems through multi criteria analytical hierarchy process"", IEEE, doi: 10.1109/ICET.2012.6375419, 2012, pp. 1-8. (Year: 2012).

Rox et al., ""Construction and Deconstruction of Hierarchical Event Streams with Multiple Hierarchical Layers"", IEEE, doi: 10.1109/ECRTS.2008.13, 2008, pp. 201-210. (Year: 2008).

Notice of Allowance dated Feb. 18, 2022 for U.S. Appl. No. 17/083,145, 70pgs.

Office Action dated Mar. 21, 2022 for U.S. Appl. No. 16/864,905, 125 pgs.

Muskardin et al., "Implementation of Hashing Algorithms in Stream Mining", International Conference on Smart Systems and Technologies (SST), Oct. 2018 , pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

M. Liu, M. Li, D. Golovnya, E. A. Rundensteiner and K. Claypool, "Sequence Pattern Query Processing over Out-of-Order Event Streams,"

(56) References Cited

OTHER PUBLICATIONS

2009 IEEE 25th International Conference on Data Engineering, 2009, pp. 784-795, doi: 10.1109/ICDE.2009.95. (Year: 2009).
Office Action dated Apr. 20, 2022 for U.S. Appl. No. 16/944,094, 48 pages.
Office Action dated Apr. 12, 2022 for U.S. Appl. No. 17/038,102, 48 pages.
Notice of Allowance dated Apr. 27, 2022 for U.S. Appl. No. 17/127,724, 19 pages.
Office Action dated May 24, 2022 for U.S. Appl. No. 17/237,535, 62 pages.
Non Final Office Action received for U.S. Appl. No. 18/164,744 dated Aug. 31, 2023, 46 pages.
Notice of Allowance received for U.S. Appl. No. 17/976,574, dated Jul. 6, 2023, 41 pages.
Non-Final Office Action received for U.S. Appl. No. 17/503,024, dated Jun. 23, 2023, 87 pages.
Notice of Allowance received for U.S. Appl. No. 17/145,588, dated Aug. 7, 2023, 28 pages.
Non Final Office Action received for U.S. Appl. No. 17/976,574 dated Mar. 2, 2023, 55 pages.
Notice of Allowance received for U.S. Appl. No. 17/337,940 dated Mar. 1, 2023, 70 pages.
Notice of Allowance received for U.S. Appl. No. 17/223,263, dated Apr. 6, 2023, 32 pages.
Office Action dated May 12, 2023 for U.S. Appl. No. 17/152,558, 51 pages.
Notice of Allowance dated Nov. 15, 2022 for U.S. Appl. No. 16/864,892, 48 pages.
Notice of Allowance dated Nov. 23, 2022 for U.S. Appl. No. 17/408,344, 35 pages.
Notice of Allowance dated Nov. 17, 2022 for U.S. Appl. No. 16/944,094, 23 pages.
Notice of Allowance received for U.S. Appl. No. 17/063,906, dated Feb. 6, 2023, 29 pages.
Notice of Allowance received for U.S. Appl. No. 17/383,425, dated Feb. 1, 2023, 37 pages.
Office Action dated Feb. 10, 2023 for U.S. Appl. No. 17/145,588, 78 pages.
Office Action dated Jul. 8, 2022 for U.S. Appl. No. 16/864,892, 33 pages.
Office Action dated Jul. 15, 2022 for U.S. Appl. No. 16/864,905, 77 pages.
Office Action dated Sep. 1, 2022 for U.S. Appl. No. 16/944,094, 25 pages.
Office Action dated Jul. 21, 2022 for U.S. Appl. No. 17/070,029, 68 pages.
Notice of Allowance dated Aug. 24, 2022 for U.S. Appl. No. 17/152,544, 55 pages.
Office Action dated Sep. 15, 2022 for U.S. Appl. No. 17/383,425, 61 pages.
Phaujdar, "Understanding Event Streams—A Comprehensive Guide 101_ Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8]—(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).
Office Action dated Sep. 30, 2022 for U.S. Appl. No. 17/408,344, 66 pages.
Non-Final Office Action received for U.S. Appl. No. 17/063,906, dated Oct. 27, 2022, 59 pages.
Notice of Allowance received for U.S. Appl. No. 16/864,905, dated Nov. 30, 2022, 347 pages.
Tony Tung et al., "Topology Dictionary for 3D Video Understanding", IEEE Transactions on Pattern Analysis and Machine Intelligence ( vol. 34, Issue: 8, Aug. 2012), Dec. 2011, pp. 1645-1657.
A. Bulut et al., "Distributed data streams indexing using content-based routing paradigm", 19th IEEE International Parallel and Distributed Processing Symposium, Apr. 2005, pp. 1-10.
Notice of Allowance received for U.S. Appl. No. 17/070,029, dated Dec. 2, 2022, 36 pages.
Non-Final Office Action received for U.S. Appl. No. 17/223,263, dated Nov. 28, 2022, 64 pages.
Non-Final Office Action received for U.S. Appl. No. 17/152,558, dated Dec. 7, 2022, 59 pages.
Non-Final Office Action received for U.S. Appl. No. 17/337,940, dated Dec. 30, 2022, 68 pages.
Non-Final office action received for U.S. Appl. No. 17/152,558 dated Oct. 19, 2023, 66 pages.
Non-Final office action received for U.S. Appl. No. 17/228,611 dated Dec. 11, 2023, 70 pages.
Notice of Allowance received for U.S. Appl. No. 18/164,744 dated Dec. 28, 2023, 81 pages.
Final office action received for U.S. Appl. No. 17/503,024 dated Dec. 1, 2023, 98 pages.
Notice of Allowance received for U.S. Appl. No. 17/145,588, dated Oct. 18, 2023, 6 pages.
Notice of Allowance for U.S. Appl. No. 17/503,024 dated Feb. 23, 2024, 63 pages.

* cited by examiner

INFORMATION-UNIT BASED SCALING OF AN ORDERED EVENT STREAM

BACKGROUND

Data can be stored via an ordered event stream data storage system. Conventionally, adapting a topology of an ordered event stream of an ordered event stream data storage system can be based on an amount of data to be stored by, or read from, an ordered event stream.

DETAILED DESCRIPTION

Figure 1:
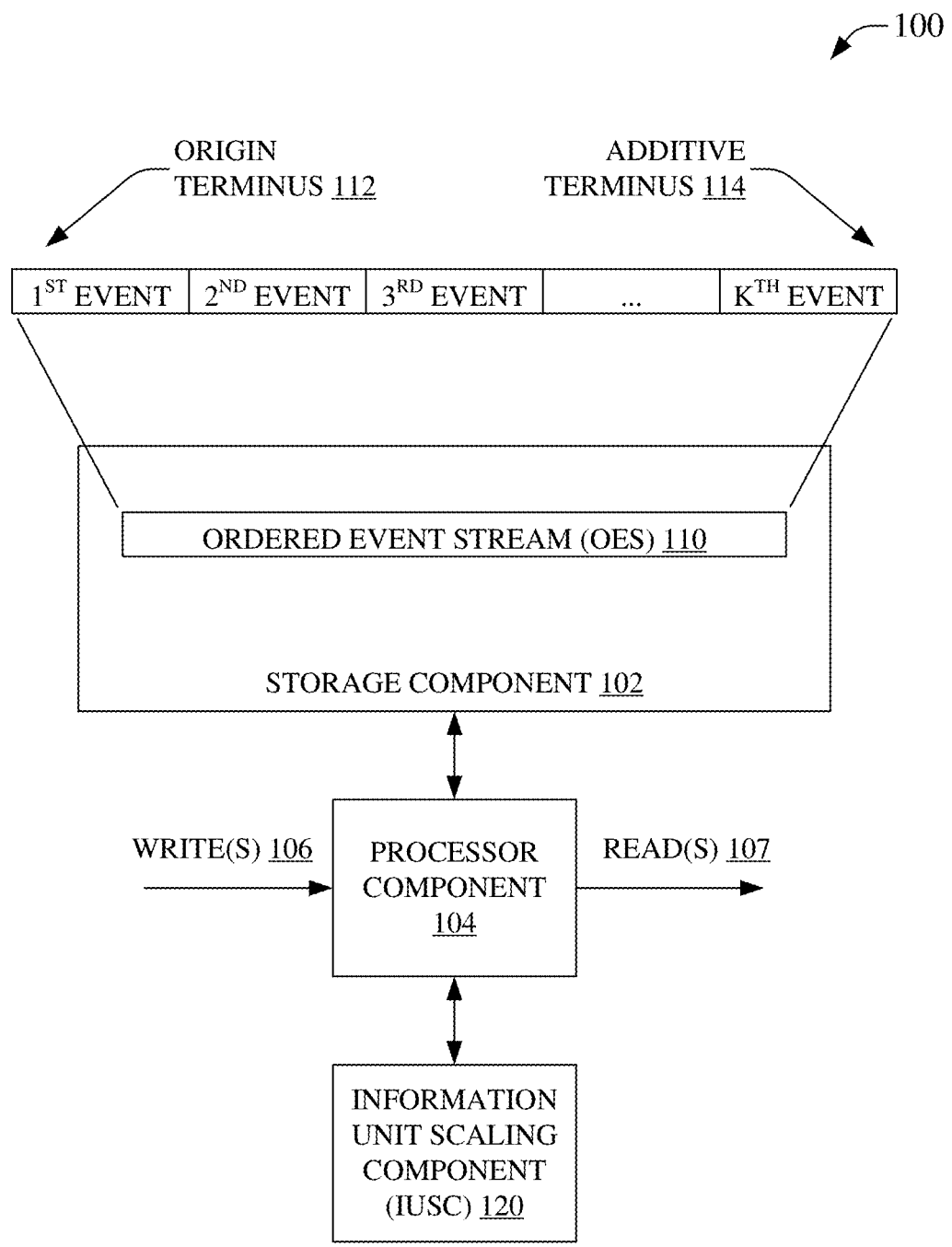
FIG. 1 is an illustration of an example embodiment that can facilitate scaling of an ordered event stream (OES).

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter relates to data storage via an ordered event stream (OES) data storage system (OES system) and, more particularly, to scaling storage regions, e.g., segmentation, OES topography, etc., of one or more ordered event streams stored by an ordered event stream data storage system. Conventional OES systems can be scaled based on an amount of data to be stored, written, read, accessed, etc., e.g., the OES can be scaled based on a count of the ones and zeros that are to be stored/accessed via an OES of an OES system. It is noted that the amount of data to be stored/accessed is distinct from the amount of information to be stored/accessed. In this regard, an amount of data can embody various amounts of information via the data. As an example, images of the same data size, a first 1-megabyte (MB) image can comprise low amounts of data, such as an image of just a stark a white wall, while a second 1 MB image could comprise moderate amounts of information, e.g., an image of just a pair of dice, and a third 1 MB image can comprise large amounts of data, such as for an image of a crowd of people. As such, the idea of scaling an OES based on an amount of information can be attractive in some OES system embodiments. While some embodiments can continue to benefit from data-based scaling, for example, where OES events generally contain similar amounts of information, in other embodiments where different OES events can comprise more varied amounts of information for relatively consistent data-sizes, information-based scaling can be an attractive alternative scaling metric. Information-based scaling of an OES, or portion thereof, is accordingly disclosed in more detail herein below.

At a basic level, an ordered event stream (OES) can be a durable, elastic, append-only, and potentially unbounded, sequence of events. An event can be added to a head of a stream of events, e.g., a first event can be considered as residing at a tail of an OES and a most recent event can be regarded as residing at a head of the OES with other events ordered between the tail and the head of the OES. It is noted at this point that an OES can generally be referred to as a 'stream,' 'event stream,' or similar term herein throughout. The events need not be stored in contiguous storage locations to be logically sequenced in an OES, stream representation, etc., e.g., a first event of an OES can be stored on a first disk, a second event of the OES on a remotely located second disk, and a third event of the OES stored at a further remote third disk. As such, a stream can be said to logically sequence the example first, second, and third events by reference to their stored data in different physical locations, and the OES can be regarded as an abstraction enabling ordering of the events comprised in the stored data at any physical location(s), e.g., the stored events can be regarded as being ordered according to the OES, thereby enabling writing, reading, or other event operations, to occur according to an ordering of the events embodied in the OES. It is noted that some stream storage systems can employ an alternative head/tail terminology, for example, a first event can be added at a head of an OES, while subsequent new events can then be added sequentially to a tail of the OES, however, this is indistinguishable in all other ways from the head/tail convention generally employed in the instant disclosure, e.g., an event is still part of a sequence of events and corresponds to a key as disclosed elsewhere herein.

Events of a stream can be associated with a routing key, or simply key for convenience, typically a hashed routing key. A key can often be derived from data, or information embodied in the data, of the event, e.g., a "machine-id," "location," "device type," "customer number," "vehicle identifier," etc., corresponding to information of the event. In one or more embodiments, an event can be associated with a key, however, data yet to be written to an event can be associated with an access target value that can be the same value as the key, e.g., the access target value can be determined based on the data, or information embodied in the data, of the event, a characteristic corresponding to the event to be recorded, etc., such that the access target value can be regarded to be the same as the key. Accordingly, the terms event key, hashed key value, access target value, key, etc., can be used interchangeably for convenience, unless the context indicates a more specific use. In an example, an access target value can correspond to data to be stored in an event and can be derived from data, information embodied in the data, or some other characteristic(s) corresponding to the data, such that when the event is stored, the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a 'key's value,' such that access to events of an OES can be based on comparing the access target value to key values for actual stored events, where an existing event is to be read, or key values that will be used to store an event, where an event will be written into the OES according to the access target value. Again, it can be generally easier to just use the term key for both access target value and routing key, unless more specificity is needed in an example, and this convention is generally used throughout the instant disclosure for simplicity and brevity. Events with the same routing key can be written to a corresponding stream or stream segment, and can also be consumed, e.g., read, etc., in the order in which they were written to the stream or stream segment.

A stream can be comprised of a group of portions, e.g., shards, partitions, pieces, etc., that can generally be referred to as stream segments, or simply segments for convenience. The segments can act as logical containers for one or more events within a stream, e.g., it is understood that events written to geographically disparate data storage devices can logically be written to the same stream segment, e.g., same logical container, according to the instant disclosure. When a new event is written to a stream, it can be stored to a segment of the stream based on a corresponding key. Event routing keys can form a 'key space,' 'hashed key space,' etc. The key space can be employed to divide the stream into a number of parts, e.g., segments. In typical embodiments, consistent hashing can be employed to assign events to appropriate segments. As an example, where a stream comprises only one segment, all events to be written to the stream are accordingly written to the same segment in an ordered manner, wherein this example segment simply corresponds to the entire key space. As another example, where a stream comprises two parallel segments, the key space of the event, e.g., from zero to 'n', can be associated with the two segments, however each of the two segments can be associated with a portion of the total key space, for example, the first segment can store events of time t with a key between zero and 'm' and the second segment can store other events of time t with a key between 'm+1' and 'n'. This can also be written as, "0<[first segment event keys]<m< [second segment event keys]<n." It will be appreciated that more segments can serve to further divide the key space such that a segment can store an event with a key falling within the range of the key space associated with that segment. As an example, a four-segment event stream can have each segment store data at time t for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In one or more embodiments, a segment of an event stream can typically be associated with a single processing instance, e.g., one processor, one cooperating group of processors, etc., to assure ordering of the events stored in the segment. A processing instance can be a single real physical processor, a virtualized processor instance executing on one or more real physical processors, a group of real physical processors, a group of virtual processor instances executing on one or more real physical processors, etc. As an example, a processing instance can be embodied via a blade server in a computing facility. As another example, a processing instance can be a virtual processor deployed in an elastic computing system, e.g., a 'cloud server,' etc. Typically, a processing instance can be associated with a level of performance which, in some embodiments, can be measured via one or more key performance indicators (KPIs) for the processing instance. As an example, a first blade server can have a first level of performance and a second blade server can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance.

Generally, the computing resources of a processing instance can be associated with costs, e.g., monetary costs, electrical consumption costs, dispersion of generated heat costs, support costs, real estate for deployment costs, operations per unit time as a cost, etc. Computing resources can further comprise computer memory, computer storage, network access, virtual computer resource access, etc. Therefore, generally, selecting an appropriate processing instance, or other computing resource, can be associated with optimizing various costs. As an example, if an event stream typically consumes less than one unit of work, then pairing the stream with a processing instance that can perform one unit of work can be deemed a better use of computing resources, e.g., lower overall aggregate costs, etc., than pairing the event stream with a processing instance that can perform 200 units of work which can result in wasting up to 199 units of work through underutilization. Moreover, in this example, the 200-unit processing instance, for example, can be a newer high end processing instance that can have a high monetary cost, and generate more heat than the one-unit processing instance that, for example, can be a low-cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance processing instance.

In various embodiments described herein, scaling technology employed in a stream data storage system can improve a stream data storage system, such as by scaling an OES to comprise one or more segments that can improve use of computing resources in contrast to a conventional unscaled stream data storage system. In one or more example embodiments, a portion of a stream, e.g., an OES or portion thereof, can be divided evenly to distribute the work corresponding to event operations, e.g., splitting a stream in to two subsequent similar portions can, for example, enable use of two processors in parallel rather than one processor. This can be regarded as a form of 'symmetrical scaling' of an event stream. Alternatively, a stream can be split into dissimilar portions, regarded as a form of 'asymmetrical scaling,' that can result in portions that are dissimilar, e.g., one resulting segment can correspond to a greater or lesser key space than a second resulting segment, etc. In some embodiments, symmetric and asymmetric scaling can be performed on one portion of an OES and can result in two or more subsequent other portions of the OES, for example, symmetrical scaling of a stream into three or more similar portions, etc. In one or more embodiments, these other portions can also comprise a mix of symmetric and asymmetric splits of the stream, for example, a first portion of a stream can be split into a second, third, and fourth portion, wherein the second and third can be similar, e.g., symmetric, and the fourth portion can be dissimilar from the second or third portion, e.g., asymmetric. In this example, the scaling can be referred to as 'mixed scaling,' e.g., implying that the subsequent portions of the stream after scaling can comprise a mix of symmetric and asymmetric portions, see the various example symmetric scaling changes to segments of an example OES illustrated in FIG. 2.

Scaling of the event stream can be in response to a threshold consumption of computing resources, e.g., when a threshold work level is traversed, an event stream can be scaled. In one or more embodiments, scaling can generally be associated with allocating computing operations to logical portions of an ordered stream of events. As an illustrative example, first processor(s) can satisfactorily write 5000 events per unit time to an ordered event stream, e.g., into storage corresponding to the ordered event stream, however, where the rate of events to be written to the stream, for example, doubles to 10000 events per unit time, the first processor(s) can be determined to be underperforming due to being overly burdened and it can be desirable to scale the OES to compensate for overburdening of the first processor(s). As such, scaling can add second processor(s) such that the load on the first, and now the second, processors can be similar, e.g., the writing of the example 10000 events per unit time can be managed by two or more processor after the scaling rather than just the first processor(s) before the scaling of the OES. As noted elsewhere herein, the scaling can be symmetric, asymmetric, or mixed scaling. It can be further noted that symmetric scaling of a key space can result in non-symmetric loading of a computing resource(s). As an expansion of a previous example, where a first processor(s) writes 5000 events per unit time to event keys between 0 and 0.5 of a key space, and this load doubles as a result of an additional 5000 writes with an event key between 0 and 0.1 of the key space, then scaling the OES by symmetrically dividing the key space between the first processor(s) from 0 to 0.25 and the second processor(s) from 0.25 to 0.5 of the key space should not result in a symmetric division of computer resource loading, e.g., the first processor(s) would now address a portion of the initial 5000 events and an additional burden from the 5000 events between 0 and 0.1 of the key space, while the second processor(s) would address the initial 5000 events less the portion still being managed by the first processor(s), but would not get any part of the additional 5000 events. As such, mere equal key space division of a portion of an OES that is ignorant of the distribution of work across the key space of the event stream can be less effective that might otherwise be imagined. Improved scaling technologies can be considerate of a resulting workload and can, for example, accommodate asymmetric scaling of a portion of an OES based on a key space characteristic(s), such that resulting workloads can be distributed to available computing resources in a more tailored manner, e.g., a scaling vent can have asymmetric key space scaling that can result in symmetric computing resource use, etc. Moreover, advanced scaling techniques can perform scaling intelligently, e.g., based on indications received from a user, administrator, analytics component, optimization engine, etc., to selectively burden a portion(s) of available computing resources according to a performance, capability, metric, etc., of an individual portion(s) of the available resources, e.g., adding an additional mid-range processor can result in a different scaling than adding another high-end processor. Optionally, scaling can also be selectively deferred, wherein the deferral can reduce consumption of computing resources, e.g., committing a scaling event can consume computing resources so it can be desirable to scale in response to determining that the scaling would beneficial over and above any use of computing resources to commit the scaling event itself.

The general discussion of scaling can be examined with more nuance. Where events can be of similar data size, e.g., events can consume a similar amount of computing resources to write, read, move, etc., then this can suggest that where computing resources remain adequately burdened, then there can be no impetus to scale an OES. However, if computing resource demands beyond the edges of an OES system are considered, there can be benefits to scaling the OES even where the data-size of events and volume of events can remain relatively consistent. As an example, where a reader application receives event data read from an OES, and where the amount of information embodied in the received event data can vary, this variable amount of information can, in some embodiments, tax the computing resources associated with the reader application. In this example, the reader application devices can become overburdened via attempting to extract information from a stream of data that can be relatively consistent in size. This could happen, for example, where a stream reads video frames to video reader application that extracts identities of persons in the video frames read. In this example, where there are no faces in first video frames, then there can be substantially less reader processing than for second video frames that can comprise many faces. Where there are many faces, the computing resources of the example reader application can be much more burdened and it can be appropriate to scale the OES to allow for additional reader application instances to be implemented, each reading events from a narrower key space region. This can serve to preserve event ordering while also allowing a reduced event reading rate per reader application to counterbalance high computing resource demands on some reader applications. Similarly, where the count of faces drops in the example, the OES can be scaled down to present fewer segments that can correspond with fewer reader applications. This can be understood to illustrate scaling by an amount of information, e.g., an information-unit, rather than by an amount of data. Accordingly, an OES can be scaled in regard to data, information, or combinations thereof. It is noted that other scaling metrics can also be employed without departing from the scope of the instant disclosure, but these other metrics are beyond the scope of the instant disclosure and are therefore not further discussed herein.

Embodiments can employ information-based scaling, data-based scaling, or scaling based on other metrics. As is disclosed elsewhere herein, information can be represented by data of an event, e.g., the data of the event can be the binary data that is stored as the event, while the information, in contrast, can be information represented in the data. It can be readily appreciated with events of a same data size can comprise vastly different amounts of information, for example, by employing compression technology to fit more information in a given amount of data. Moreover, extraction of information from data can consume different amounts of computing resources. Typically, the term 'information-unit' can indicate a first amount of computing resources that can be consumed in accessing information embodied in event data. As such, an event that is two information units (IUs) can consume twice the computing resources to access the information embodied in a unit of data as for a one IU event. This concept can extend to determining that a four IU event that is two data units in size comprises double the information per data unit of a one IU event that is one data unit in size, e.g., 4 IU/2 DU=2×(1 IU/1 DU). Accordingly, scaling an OES based on IUs can reflect an amount of computing resources that can be consumed to access information embodied in event data. In an embodiment, feedback from read applications indicating computing resource usage to access information from event data can be employed to scale an OES. In some embodiments, OES scaling can be applied after an event is written, e.g., the topology of an OES can be scaled based on reader application feedback related to an IU metric after events have been written. In this embodiment, for instance, reading events days after they were written can result in scaling the OES based on IU metrics. In additional, historic IU determinations can be employed in scaling an OES at event writing. In these embodiments, for example, analysis of an event, e.g., prior to writing, in regard to other historically written events of a similar type, etc., can reflect a more linear relationship between an amount of data and an amount of information, such that the amount of data can be used as an indicator of an amount of information, thereby allowing scaling of the OES when writing events. Furthermore, in embodiments scaling at event writing, the event data can be analyzed before writing to explicitly determine an IU metric that can then be employed in scaling the OES when writing the corresponding event. These embodiments can be viewed as preprocessing data of an event to be written to extract IU metrics to facilitate writing the event in a correspondingly scaled OES. In some of these embodiments, less than all events can be preprocessed, e.g., a random sampling of events, periodic events, etc., can be selected for preprocessing to determine an IU metric that can be applied to OES scaling when writing events.

To the accomplishment of the foregoing and related ends, the disclosed subject matter, then, comprises one or more of the features hereinafter more fully described. The following description and the annexed drawings set forth in detail certain illustrative characteristics of the subject matter. However, these characteristics are indicative of but a few of the various ways in which the principles of the subject matter can be employed. Other characteristics, advantages, and novel features of the disclosed subject matter will become apparent from the following detailed description when considered in conjunction with the provided drawings.

FIG. 1 is an illustration of a system 100, which can facilitate scaling of an ordered event stream (OES), in accordance with one or more embodiments of the subject disclosure. System 100 can comprise a storage component 102 that can store one or more OESs, e.g., OES 110, etc. Generally, OES 110 can store one or more events. An event is associated with a key, e.g., a routing key. A key can typically be determined from characteristics of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner according to the key. Similarly, events with a same key can be read from OES 110 in an ordered manner, e.g., in the order they were previously written into OES 110. Components providing events to be written can be termed 'writers' and components requesting events can be termed 'readers.' As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102, e.g., write(s) 106 can be received from a writer application instance, etc. Processor component 104 of a system 100 can provide access to events of OES 110 based on a key, e.g., as read(s) 107 that can be communicated to a reader, e.g., read(s) 107 can be facilitated for a reader application instance, etc. Generally, one processing instance, e.g., processor component 104, etc., is designated for writing events to a portion, e.g., segment, of OES 110. OES 110 can comprise one segment and/or parallel segments, e.g., stream segments, etc., that can store events according to a key. In an example embodiment, more than one processing instance writing to a single segment of an OES can typically be disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. In an example embodiment, while more than one processing instance writing to a segment of an OES is typically disfavored, more than one processing instance reading from a segment can be fully supported, encouraged, etc. As such, for a given number of segments, in some embodiments, there can be up to the same number of processing instances, e.g., to limit more than one processor instance writing to a segment. Although adding more processing instances can be allowable, for example to increase read operations, these additional processing instances can be constrained to read operations to limit the possibility of scrambling an order of events being written to a segment. It is further noted that system 100 can comprise idle processing instances that are not reading or writing to the OES, for example, as reserve processing instances supporting failover operations protecting against an active processing instance becoming less responsive, in support of scaling events, etc. In one or more embodiments, keys of one or more segments of an OES can represent a key space for OES 110. Segments can therefore act as logical containers associated with a particular range of keys for a portion of an event stream and can be used to store events of OES 110. When a new event is written to a stream, it can be logically stored to a segment based on the event key regardless of where it is physically stored. In an example embodiment, the key space can be divided into a number of ranges that can correspond to the number of segments comprising an OES, e.g., OES 110. As an example, a key space for an OES can be from 0 to 100, the OES can comprise two parallel segments wherein the first segment can sequentially store events with, for example, keys from 0 to 30, and the second segment can sequentially store events with keys from >30 to 100. In this example, a first event with a key of 54 can be appended to the second segment, a second event with a key of 29 can be appended to the first segment, a third event with a key of 14 can be further appended to the first segment after the second event, etc. In an example embodiment, storage component 102 can store one or more OESs, although only OES 110 is illustrated for clarity and brevity.

OES 110, as illustrated in system 100, can be an overly simplistic example of an OES that can comprise just one segment for storing incoming event write(s) 106 and sourcing event read(s) 107, and therefore the key space of OES 110 can be embodied in the illustrated single segment of events, e.g., the key space of OES 110 is not illustrated as being distributed across more than one parallel event storage segment. OES 110 can have an origin terminus 112. Whereas the reader of this document is expected to understand that the OES represents a logical ordering of events actually stored on physical storage devices, the instant disclosure will generally simply refer to logically writing to an OES as writing to an OES for the sake of brevity. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events, e.g., an OES can logically represent events stored at any number of physical storage locations, e.g., spanning files, spanning disks, spanning data centers, etc. In an example, a $(K+1)^{th}$ event can be appended to the $K^{th}$ event of OES 110 at additive terminus 114. In an embodiment, storage component 102 can store any number of OESs. Moreover, any one OES can comprise any number of parallel segments, e.g., stings of events for a defined key space range. Each segment can comprise an ordered sequence of stored events.

In system 100, information-unit scaling component (IUSC) 120 can facilitate OES scaling based on an IU metric. In an embodiment, an IU metric can represent an amount of computing resources that can be consumed to access information represented in data of an event. In this regard, some events can comprise more information per unit of event data, some events can consume more computing resources to access an amount of information embodied in event data, etc. Accordingly, even where reading event data itself may not necessarily overburden computing resources of an OES system, IU metrics can indicate that other components of, or components in communication with, an OES system can be sufficiently burdened so as to benefit from the OES system scaling an OES to allow properly ordered access to events, e.g., according to different key space topologies of corresponding OES epochs. As an example, where events of a stream are one unit of data in size, and between t1 and t2 each event embodies information that can consume 10 units of computing resources to access, while between t2 and t3 each event can consume 150 units of computing resources to access embodied information, then where a reader can supply up to 80 units of computing resources to extract information from the event data, the reader can be more than adequate between t1 and t2 but be overburdened between t2 and t3. In this example, an OES system can experience the same data throughput between t1 and t2 as between t2 and t3, e.g., the event data remains at one data unit per event. As such, in this example, the IU value can go from 10 to 150 while the data unit (DU) can remain at 1. Accordingly, it is noted that between t2 and t3, the reader can be overburdened, which can be managed in numerous ways, e.g., buffering read out event data, adding processors that may compromise the read-out ordering of the events, etc. However, an alternative can be to signal the OES system that the reader is above a threshold IU value such that the OES system can scale the OES to divide the read-out events into two (or more) segments that can then be, for example, read by two readers in a manner that can preserve event ordering.

Continuing the above example, when events write(s) 106 are received, IUSC 120 can facilitate preprocessing one or more write(s) 106 prior to those write(s) being committed to OES 110. The preprocessing can emulate, simulate, perform an analysis based on a model of, etc., an indicated reader application to determine a predicted IU value that can then be employed in scaling OES 110 when writing the corresponding event thereto. In some embodiments one, some or all write(s) 106 can be preprocessed in regard to OES scaling. In these embodiments, differences between an indicated reader application and an eventual actual reader application can result in mismatches in any corresponding OES scaling, e.g., if the writing is performed according to a predicted IU value for a reader application executing on a rudimentary computing platform and then the OES is later read by a reader application executing on a supercomputer platform, the scaling of the OES at writing can be quite far removed from scaling that would have been more appropriate at the time of reading the OES. As such, reader application feedback can still be employed in conjunction with write time OES scaling based on IU metrics. In these embodiments, scaling at the time of writing can then be compensated for at the time of reading by further OES scaling.

Figure 2:
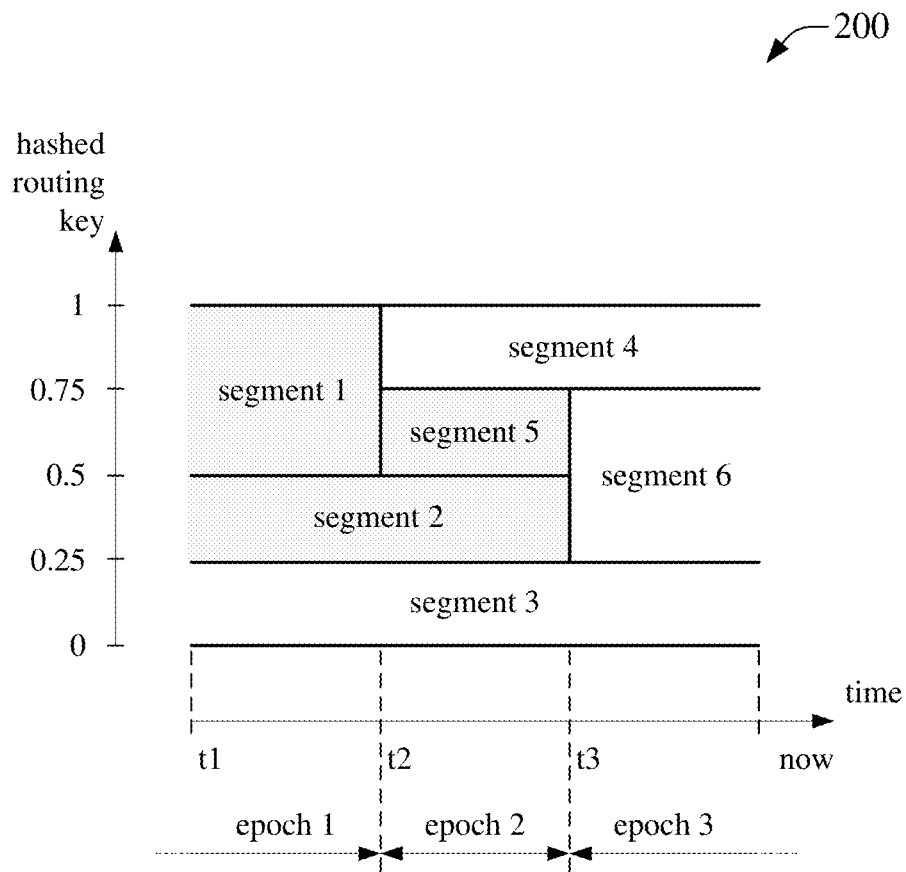
FIG. 2 is an illustration of an example OES topology that can correspond to information-unit based scaling of an example OES embodiment.

FIG. 2 is an illustration of an example OES topology that can correspond to information-unit based scaling of an example OES embodiment, in accordance with one or more embodiments of the subject disclosure. Generally, an OES can comprise segments corresponding to a key space topology, e.g., key space 200, etc. At a first time, for example t1, key space 200 can correspond to one or more parallel segments, e.g., segment 1, segment 2, segment 3, etc. At some point a segment of the corresponding OES can be scaled. As an example, at t2, segment 1 can be scaled up. This can result in causing segment 4 and segment 5 in key space 200 and correspondingly sealing segment 1 therein. The topology of the OES comprising segments 1-3 and the corresponding key space up to time t1, can be designated as epoch 1. Similarly, the topology of the OES comprising segments 4-5 and 2-3, and the corresponding key space between t1 and t2, can be designated as epoch 2, etc. It is noted that the close relationship between segment(s) of an OES and the corresponding portions of a key space of the OES can often result in mixing of the terms 'OES' and 'key space,' e.g., key space 200 can often be referred to as 'OES 200' for the sake of brevity. Such noted conventions are used hereinbelow for the sake of brevity, e.g., key space 200 can be referred to as and OES 200 hereinbelow even where such nomenclature is technically less correct, unless implicitly or explicitly indicated otherwise, e.g., the reader of this disclosure is expected to appreciate the tight coupling between a key space and the corresponding OES is such that it is less wordy to simply refer to key space 200 as illustrating the logical arrangement of OES segments as 'OES 200.'

In an example embodiment, segments 2 and 3 can be continuous across epochs 1 and 2 while segment 1 can end at the transition from epoch 1 to 2. In an example embodiment, in epoch 1, events associated with a key between 0.5 and 1, e.g., $0.5 > key \geq 1$, can be written (and read from)

segment 1, while in epoch 2, events associated with a key between 0.75 and 1, e.g., 0.75>key≥1.0, can be written (and read from) segment 4 and events associated with a key between 0.5 and 0.75, e.g., 0.5>key≥0.75, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 at t3. This example scaling down can reduce a count of segments comprising OES 200. The scaling at t3 can result in ending epoch 2 and beginning epoch 3. The example scaling can cayuse segment 6 and can close segments 2 and 5. As such, in epoch 3, the topology of the OES comprising segments 3-4 and 6 post-scaling can distribute the key space of OES 200, for example, as 0≤segment 3>0.25, 0.25>segment 6≥0.75, and 0.75>segment 4≥1.0.

In an example embodiment, scaling of segment 1 into segments 4 and 5 between epoch 1 and epoch 2 can be related to a change in IU values for events of segment 1. In this example embodiment, an IUSC, e.g., IUSC 120, etc., can determine that a greater amount of computing resources is being consumed to access information for events of segment 1 and the topology of that segment of the OES can be scaled to divide the key space to enable an additional processing instance to access data in an ordered manner. In this example embodiment, a reader application can be overburdened in accessing information of events of segment 1 and can, for example, fall behind readers of other segments. By scaling segment 1 into segments 4 and 5, a reader application can be applied to each resulting scaled segment and can reduce a number of events being processed without loss of event order. In this example, cutting the number of events in half can reduce the consumption of computing resources by each reader application below an acceptable threshold.

In another example, segments 5 and 2 can be condensed into segment 6 where the demand on reader applications for segments 5 and 2 fall below a threshold. This can enable an OES system corresponding to key space 200, to be more efficient by not underutilizing computing resources related to reading out events.

In some embodiments, preprocessing can be employed to scale segments of the example OES key space 200 at the time of writing events to the OES. Moreover, at the time of reading, supplemental scaling can be applied to alter the topology of the OES where an estimated IU metric at the time of writing the event can be sufficiently dissimilar to an IU metric at the time of reading events from the OES. Furthermore, whereas more than one reader application instance, e.g., of one or more reader applications, can read the same OES data, scaling for one reader application instance can impact other reader application instances, however, this can be addressed by applying a scaling policy, for example as discussed in regard to scaling policy component 622, etc., elsewhere herein.

Figure 3:
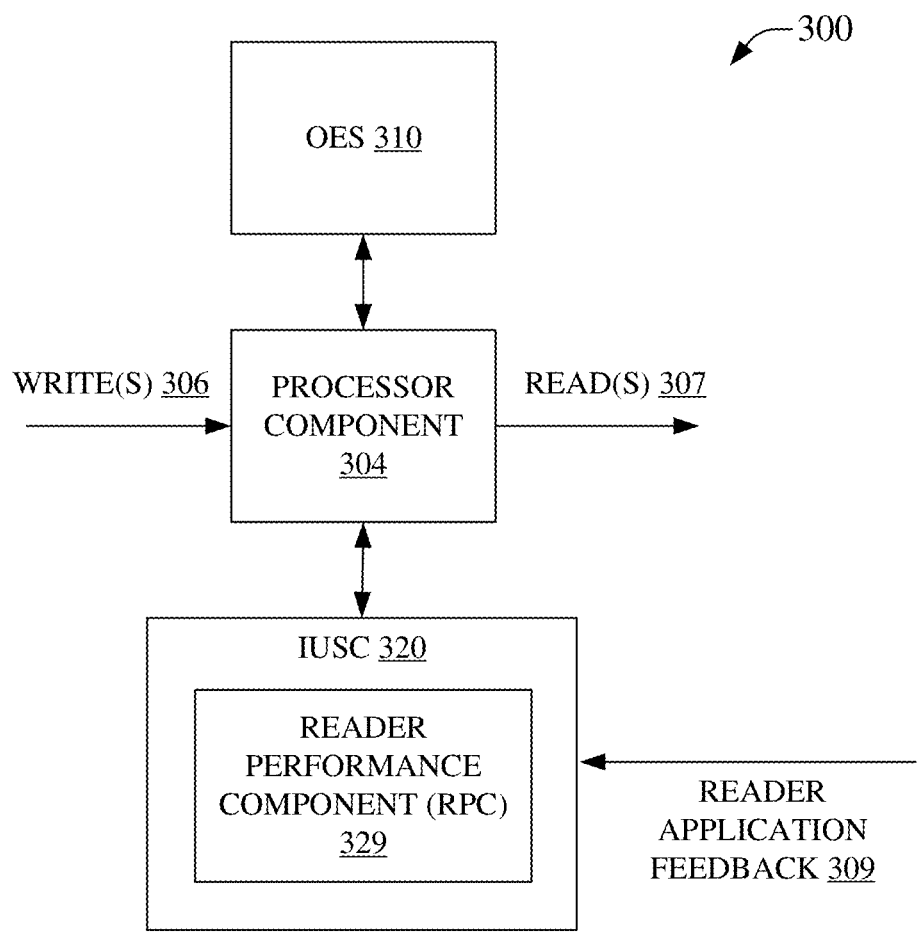
FIG. 3 is an illustration of an example embodiment that can facilitate information-unit scaling of an OES via reader application feedback.

FIG. 3 is an illustration of a system 300, which can facilitate information-unit scaling of an OES via reader application feedback, in accordance with embodiments of the subject disclosure. System 300 can comprise OES 310 that can store one or more OES events. OES 310 can store events based on write(s) 306 received by processor component 304. OES 310 can facilitate access to stored events as read(s) 307 via processor 304. OES 310 can be stored via an OES data storage system, e.g., example system 100, etc., on a storage component, e.g., storage component 102, etc. Write(s) 306 can be received from a writer application instance. A writer application instance can be embodied in components external to, but in communication with, system 300. Similarly, read(s) 307 can be communicated to a reader application instance, which in some embodiments, can be embodied in components external to, but in communication with, system 300. A writer application instance, hereinafter generally referred to as a writer, or other similar term, can be one or more writer application, e.g., a group of writer applications can be considered a writer application instance. A reader application instance, herein generally referred to as a reader, or other similar term, can be one or more reader application, e.g., a group of reader applications can be considered a reader application instance.

IUSC 320 can interact with processor component 304 of system 300 to facilitate information-based scaling of OES 310 or a portion thereof. IUSC 320 can receive reader application feedback 309. Reader application feedback 309 can indicate an IU metric, e.g., an indication of event processing computing resource demand, in terms of information unit values, for one or more reader application instances. As is noted elsewhere herein, a measurement of burden on computing resources to enable accessing information embodied in an event, e.g., an information-unit metric, can be distinct from a measurement of the size of an event in terms of bits, e.g., a data-unit metric. As an example, where a reader application instance reads events that can each be one data unit in size, the reader application instance can experience different computing resource demands to access information embodied in the data of the event. In this example, the events can store image data that facial recognition can be performed upon. Where a first example event can comprise few faces against a uniform background, the extraction of facial recognition information can demand relatively fewer computing resources than a second example event that can comprise many faces against a complex background, event where the first and the second events can be of the same or similar data-unit sizes. Accordingly, in this example, where a reader can be much more highly taxed by events similar to the second example event than for events similar to the first example event, IUSC 320 can facilitate scaling OES 310 accordingly.

IUSC 320 can comprise reader performance component 329 that can enable OES scaling based on reader application feedback 309. Reader performance component 329 can determine performance(s) of reader(s) reading from OES 310, or a portion thereof, in terms of IU metrics. In an embodiment, reader performance component 329 can determine IU performance for distinct and different readers of OES 310, for example, OES 310 can be a stream of images from several cameras facing stairwells into a train station in a metropolitan area, which OES can be, for example, accessed by readers from a transportation management system counting people in images, from a law enforcement facial recognition monitoring system, from an educational research institute studying traffic patterns based on a count of changing image pixels, etc., e.g., the same OES can be accessed by readers of one or more distinct reader instances.

Available computing resources of these different reader instances can be the same in some embodiments, but more typically can be dissimilar, e.g., the example law enforcement reader can be hugely powerful in comparison to the example educational institution reader instance because the law enforcement agency can have a much larger budget to apply to the corresponding reader. Moreover, the information being extracted from the same data can be different for different reader application instances, e.g., different readers can extract different information from the same event data. In this regard, reader performance component 329 can enable determining IU values for the several different readers in the preceding example. Moreover, IUSC 320 can then scale OES 310 based on these several different determined IU values, resulting in the different reader instances experiencing read(s) 307 under different IU values. Continuing the example, the IU value of the law enforcement reader can be relatively low in contrast to the educational reader when there are few people imaged on the example stairways, as a first scenario, which can be due to there being few faces to extract and the law enforcement reader having a large amount of computing resources compared to the educational reader. However, as the first scenario evolves into a second scenario for this example, as the number of people in the images of the stairs starts to increase, such as near peak commute times for the train station, the IU value of the law enforcement reader can indicate that the example substantial law enforcement reader computing resources are relatively more taxed than the educational reader, which can be due to the shear number of facial recognitions that the law enforcement reader can be tasked with per event image, a load not experienced by the educational reader in this example.

In these example scenarios, IUSC 320, if determined to be appropriate, can scale OES 310 to accommodate the education reader in the first scenario because the loading of the educational reader can be more affected than the law enforcement reader due to the example shear difference in available computing resources. Then, in this example, when the second scenario is experienced, IUSC 320 can alter the scaling of OES 310, again if determined to be appropriate, to support the law enforcement reader which can now be more heavily taxed than the educational reader. As such, while the amount of data, e.g., the data-unit, of the events of OES 310 can be relatively static in the above example, the information-unit values can change as a reflection of how demanding information extraction is for a given reader under some set of circumstances. This IU metric can therefore support OES scaling based on reader feedback of reader performance. The example OES, for example, can store four camera feeds. The OES of this example can be scaled to comprise two segments, each having two camera feeds. This example scaling can therefore transition from providing the law enforcement reader a single stream segment with events from four cameras to two stream segments each with events of two cameras. Where, in this example, the number of facial recognition events is about event across the camera feeds, then the law enforcement entity can add an additional reader, such that there can be two law enforcement readers each reading one segment, effectively doubling the processing power of the law enforcement system in this example. It is noted that where peak traffic passes and the facial recognition demand drops, this can be reflected in an IU of a third example scenario corresponding to IUSC 320 scaling OES 310 to reduce a number of segments, e.g., scaling down where the demand on computing resources of the law enforcement readers has reverted which can result in the example OES returning to one segment of four camera feeds, etc.

Figure 4:
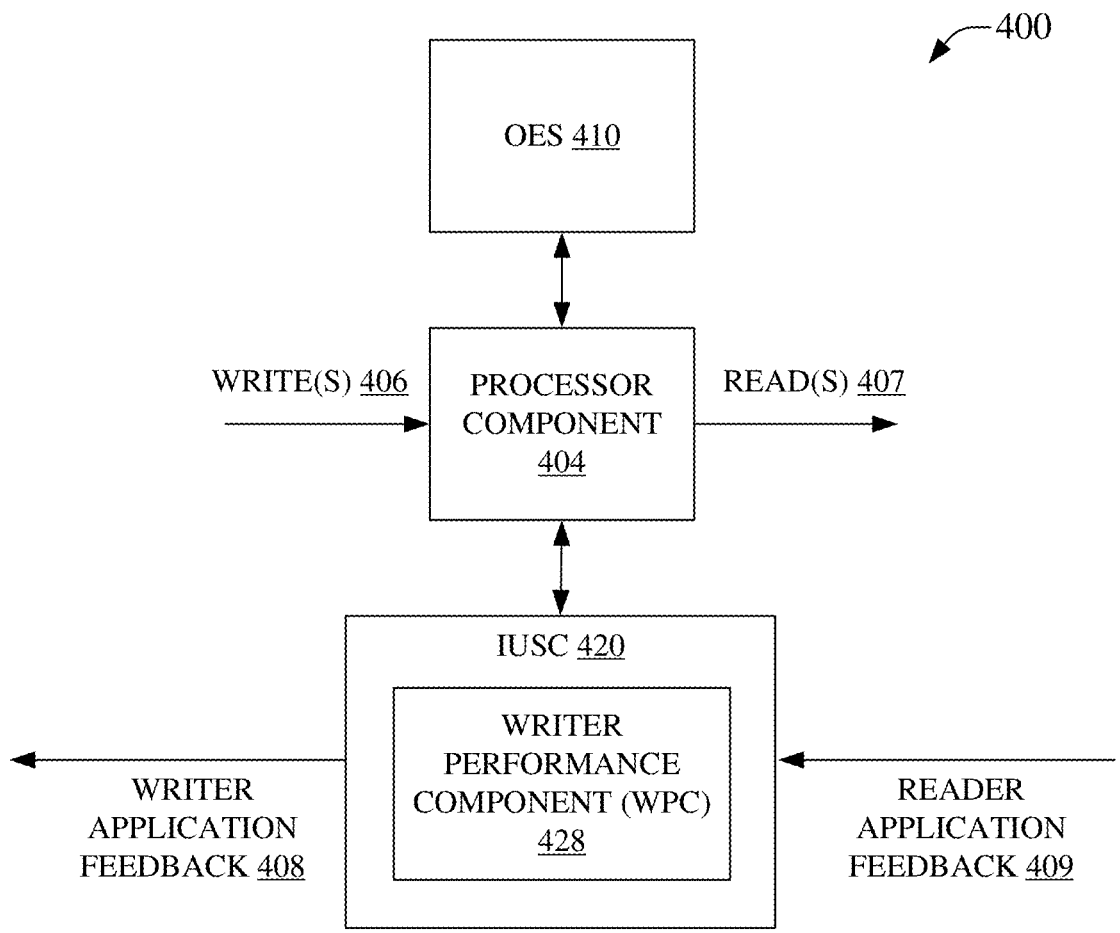
FIG. 4 is an illustration of one example embodiment facilitating information-unit scaling of for an OES via writer application feedback.

FIG. 4 is an illustration of a system 400 that can enable information-unit scaling of for an OES via writer application feedback, in accordance with embodiments of the subject disclosure. System 400 can comprise OES 410 that can store one or more OES events. OES 410 can store events based on write(s) 406 received by processor component 404. OES 410 can facilitate access to stored events as read(s) 407 via processor 404. OES 410 can be stored via an OES data storage system, e.g., example system 100, 200, etc., on a storage component, e.g., storage component 102, etc. Write(s) 406 can be received from a writer application instance. A writer application instance can be embodied in components external to, but in communication with, system 400. Similarly, read(s) 407 can be communicated to a reader application instance, which in some embodiments, can be embodied in components external to, but in communication with, system 400. A writer application instance, hereinafter generally referred to as a writer, or other similar term, can be one or more writer application, e.g., a group of writer applications can be considered a writer application instance. A reader application instance, herein generally referred to as a reader, or other similar term, can be one or more reader application, e.g., a group of reader applications can be considered a reader application instance.

IUSC 420 can interact with processor component 404 of system 400 to facilitate information-based scaling of OES 410, or a portion thereof. IUSC 420 can determine writer application feedback 408 based on data to be written to an event, e.g., received via write(s) 406, wherein writer application feedback 408 can enable scaling of OES 410 prior to writing the corresponding event. In this regard, IUSC 420 can comprise writer performance component 428 that can receive event data, e.g., via a portion of event data comprised in write(s) 406, etc., and can determine scaling of OES 410 based on the received event data prior to writing a corresponding event. Writer performance component 428 can therefore determine an IU value for an event prior to writing the event to OES 410. As such, OES 410 can be appropriately scaled based on the determined IU value prior to writing the event. Writer performance component 428 can determine the IU based on applying a model of a reader to the received event data, e.g., analyzing modeled reader performance, emulation of a reader, simulation of a reader, etc., to determine an IU value that can be employed by IUSC 420 to indicate scaling of OES 410 prior to writing the analyzed received event data. Again, the scaling of the OES can e based on IU, rather than DU, metrics.

In an embodiment, writer performance component 428 can perform analysis, emulation, simulation, modeling, etc., based on updateable reader information. The updatable reader information can comprise a default reader value, e.g., a default read model, reader emulation, reader simulation, etc. Further, the updateable reader information can comprise one or more other reader value(s), e.g., a library of reader models, emulations, simulations, etc., can be stored to enable determining various IU values based on different reader instances. In some embodiments, IUSC 420 can receive reader application feedback 409 that can indicate which readers are reading events from OES 410, and the indication of which readers are reading can be employed by writer performance component 428 to select an appropriate model, emulation, simulation, etc., upon which to perform incoming event analysis in relation to scaling OES 410. In an embodiment, writer performance component 428 can employ a history of which readers are reading from OES 410 to predict which readers will read from OES in the future, such that an appropriate reader value can be employed in analysis of incoming event data to determine scaling of the OES prior to writing corresponding events. As an example, there can be a first-type and a second-type reader emulation employed by writer performance component 428. In this example, reader application feedback 409 can indicate that only the first-type reader has been detected reading events from the OES. Accordingly, in this example, IU-based scaling determinations of IUSC 420 can be based on writer performance component 428 using the first-type reader emulation when analyzing incoming event data comprised in write(s) 406. IUSC 420 can then generate writer application feedback 408 to reflect the performed first-type reader analysis, which writer application feedback 408 can be employed to accordingly scale OES 410 prior to writing an event based on the received event data analyzed according to the first-type reader emulation. As an expansion of this example, where historically on the last day of a given month second-type readers are indicated as reading OES 410, as can be indicated via reader application feedback 409, then analysis of incoming event data can be performed according to the second-type reader emulation by writer performance component 428. As some embodiments of this example, the analysis of incoming event data can be performed according to the second-type reader emulation, the first-type reader emulation, some combination thereof, or via another selected reader emulation, by writer performance component 428.

Example system 400 can differ from example system 300 in that scaling can be performed proximate to writing events in system 400 and proximate to reading events in system 300. However, even in system 400, IUSC 420 can perform read-proximate OES scaling. Whereas scaling proximate to writing an event can embody a predicted further read performance, the scaling can be inaccurate, for example, a scaling proximate to writing can be based on a reader model that has become stale in the time between the writing and the reading of the events, other reader instances can be reading from the OES that were not predicted in the analysis relating to scaling proximate to writing, etc. As such, preprocessing of write(s) 406 to determine OES scaling before writing the corresponding events can be useful in many circumstances, but even where not ideal, further compensating scaling of the OES proximate to reading can be employed. As such, while not explicitly illustrated in system 400, IUSC 420 can further comprise a reader performance component, e.g., a reader performance component that can be the same as, or similar to, reader performance component 329.

Figure 5:
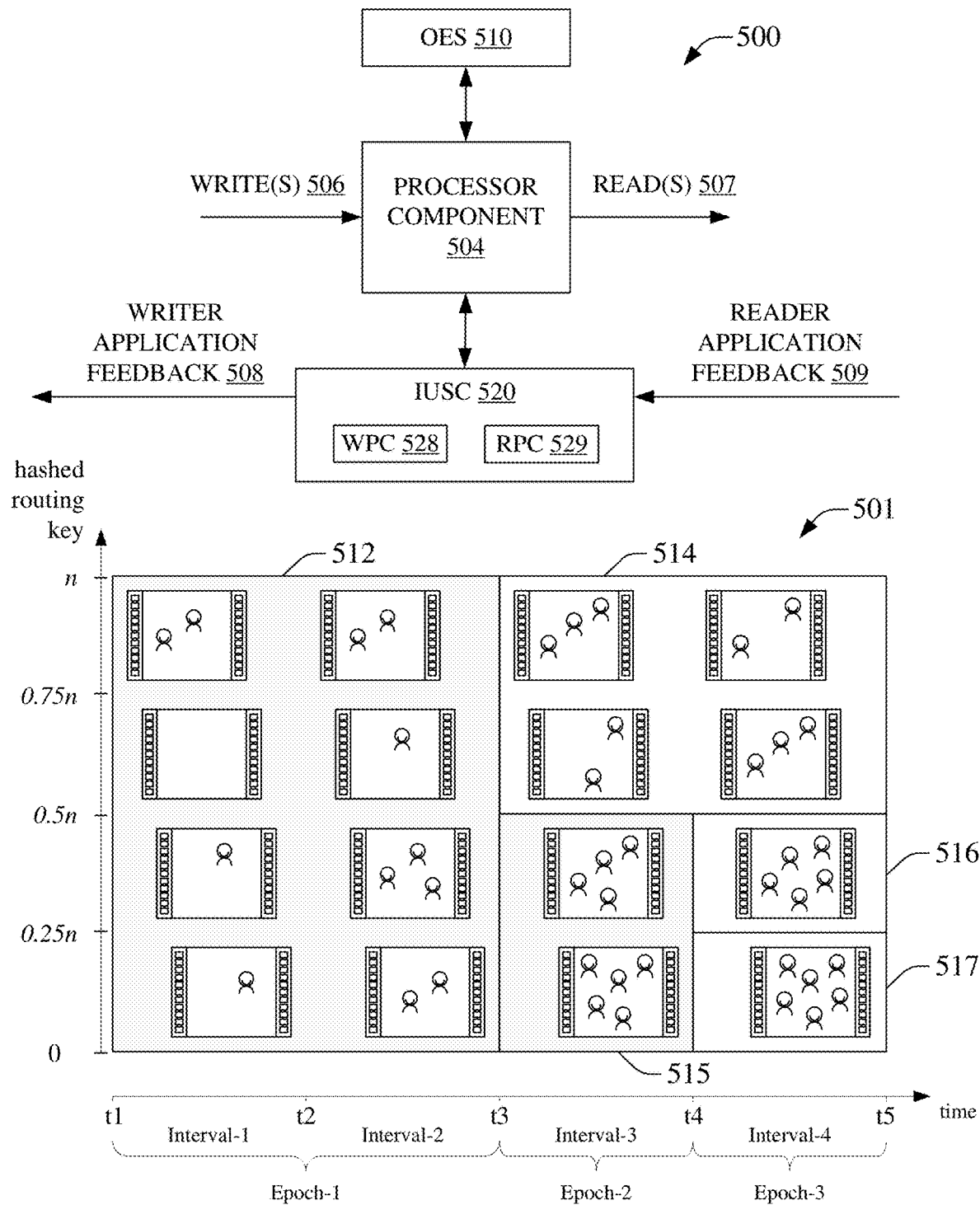
FIG. 5 is an illustration of an example embodiment enabling information-unit based scaling of an OES according to example event information content.

FIG. 5 is an illustration of a system 500, which can facilitate enabling information-unit based scaling of an OES according to example event information content, in accordance with embodiments of the subject disclosure. System 500 can comprise OES 510 that can store one or more OES events. OES 510 can store events based on write(s) 506 received by processor component 504. OES 510 can facilitate access to stored events as read(s) 507 via processor 504. OES 510 can be stored via an OES data storage system, e.g., example system 100, 300, 400, etc., on a storage component, e.g., storage component 102, etc. Write(s) 506 can be received from a writer application instance. A writer application instance can be embodied in components external to, but in communication with, system 500. Similarly, read(s) 507 can be communicated to a reader application instance, which in some embodiments, can be embodied in components external to, but in communication with, system 500. A writer application instance, hereinafter generally referred to as a writer, or other similar term, can be one or more writer application, e.g., a group of writer applications can be considered a writer application instance. A reader application instance, herein generally referred to as a reader, or other similar term, can be one or more reader application, e.g., a group of reader applications can be considered a reader application instance.

IUSC 520 can interact with processor component 504 of system 500 to facilitate information-based scaling of OES 510 or a portion thereof. IUSC 520 can receive reader application feedback 509. Reader application feedback 509 can indicate an IU metric for one or more reader application instances. As is noted elsewhere herein, a measurement of a burden on computing resources to enable accessing information embodied in an event, e.g., an information-unit metric, can be distinct from a measurement of the size of an event in terms of bits, e.g., a data-unit metric. IUSC 520 can comprise reader performance component 529 that can enable OES scaling based on reader application feedback 509. Reader performance component 529 can determine performance(s) of reader(s) reading from OES 510, or a portion thereof, in terms of IU metrics. Moreover, IUSC 420 can determine writer application feedback 508 based on data to be written to an event, e.g., received via write(s) 506, wherein writer application feedback 508 can enable scaling of OES 510 prior to writing the corresponding event. In this regard, IUSC 520 can comprise writer performance component 528 that can receive event data, e.g., via a portion of event data comprised in write(s) 506, etc., and can determine scaling of OES 510 based on the received event data prior to writing a corresponding event. Writer performance component 528 can therefore determine an IU value for an event prior to writing the event to OES 510. As such, OES 510 can be appropriately scaled based on the determined IU value prior to writing the event. Writer performance component 528 can perform analysis, emulation, simulation, modeling, etc., based on updateable reader information to determine IU values employable in scaling of OES 510 proximate to writing an event. In some embodiments, reader application feedback 509 can indicate which readers, or which types of readers, are reading events from OES 510, and the indication can be employed by writer performance component 528 to select an appropriate model, emulation, simulation, etc., upon which to perform incoming event analysis in relation to scaling OES 510.

In an embodiment, IUSC 520 can determine scaling of OES 510 based on IUs determined for information comprised in event data in accord with example key space 501. At 512, key space 501 can comprise one segment, e.g., in epoch 1, across Interval-1 and Interval-2, e.g., from t1 to t3. Events with keys between 0 and n can be written to and read from OES segment 512. For example, key space 501, an embodiment of system 500 can scale OES 510 in response to use of computing resources that can be linearly based on a count of figures represented in event data, e.g., at Interval-1 there can be four figures represented in the event data, while in Interval-2 there can be eight figures represented in the event data. In this example, the number of figures can be used as the IU value simply for the sake of illustration, e.g., in Interval-1 the IU value can be 4 and in Interval-2 the IU value can be 8. In this example, a selectable IU threshold for IUSC 520 can be set to scale for IU>7. In an embodiment, the IU values of a segment can be determined by IUSC 520 based on reader application feedback 509, e.g., at t2, RPC 529 can employ reader application feedback 509 to determine that the IU for Interval-1 was equal to 4, etc. Accordingly, at t3 of 501, segment 512 can be scaled into segments 514 and 515. Continuing this example, at t4, RPC 529 can employ reader application feedback 509 to determine that the IU for Interval-3 for segment 514 was equal to 5 and for segment 515 was equal to 8. Accordingly, IUSC 520 can be directed to keep segment 514 unscaled into Interval-4, while scaling segment 515 into segments 516 and 517. IN this example embodiment, segment 512 can be scaled in response to determining that readers have traversed a threshold information unit value, e.g., the readers are consuming sufficiently burdening computing resources to extract information from event data that scaling the OES can correspond to an appropriate change to the computing resource burden. This can occur even where there may be little to no change in an amount of data for an event, e.g., where a DU remains relatively consistent but an IU has sufficient change, the OES can be correspondingly scaled based on reader application feedback.

In another embodiment, the IU values of a segment can be determined by IUSC 520 via WPC 528 based on incoming event data comprised in write(s) 506 via an analysis employing an updatable reader model, emulation, simulation, etc. This IU value can then be employed in scaling prior to writing the corresponding event data. In this embodiment, at t1, the data for events yet to be written in Interval-1 can arrive via write(s) 506, which can be analyzed by WPC 528 to generate writer application feedback 508 that can indicate that IU=4 and that no scaling is needed. This can result in writing the events of Interval-1 without scaling, as illustrated in segment 512. At t2, the events yet to be written to Interval-2 can be analyzed. This can result in determining that IU=8, which is greater than the example threshold of 7, and so OES 510 can be scaled prior to writing the events into Interval-2, which scaling proximate to writing is not illustrated at 501 for clarity and brevity, although the expected scaling can result in division of segment 512 into segments similar to 514 and 515, just at t2 rather than at t3 as is illustrated for the scaling proximate to reading events for OES 501. This can occur even where there may be little to no change in an amount of data for an event, e.g., where a DU remains relatively consistent but an IU has sufficient change, the OES can be correspondingly scaled based on a predictive analysis of resource commitment to extract information from incoming event data prior to writing the corresponding event. In some embodiments, scaling proximate to writing events can be performed independent of scaling proximate to reading events. While in other embodiments, scaling proximate to writing events can be performed in conjunction with scaling proximate to reading events.

Figure 6:
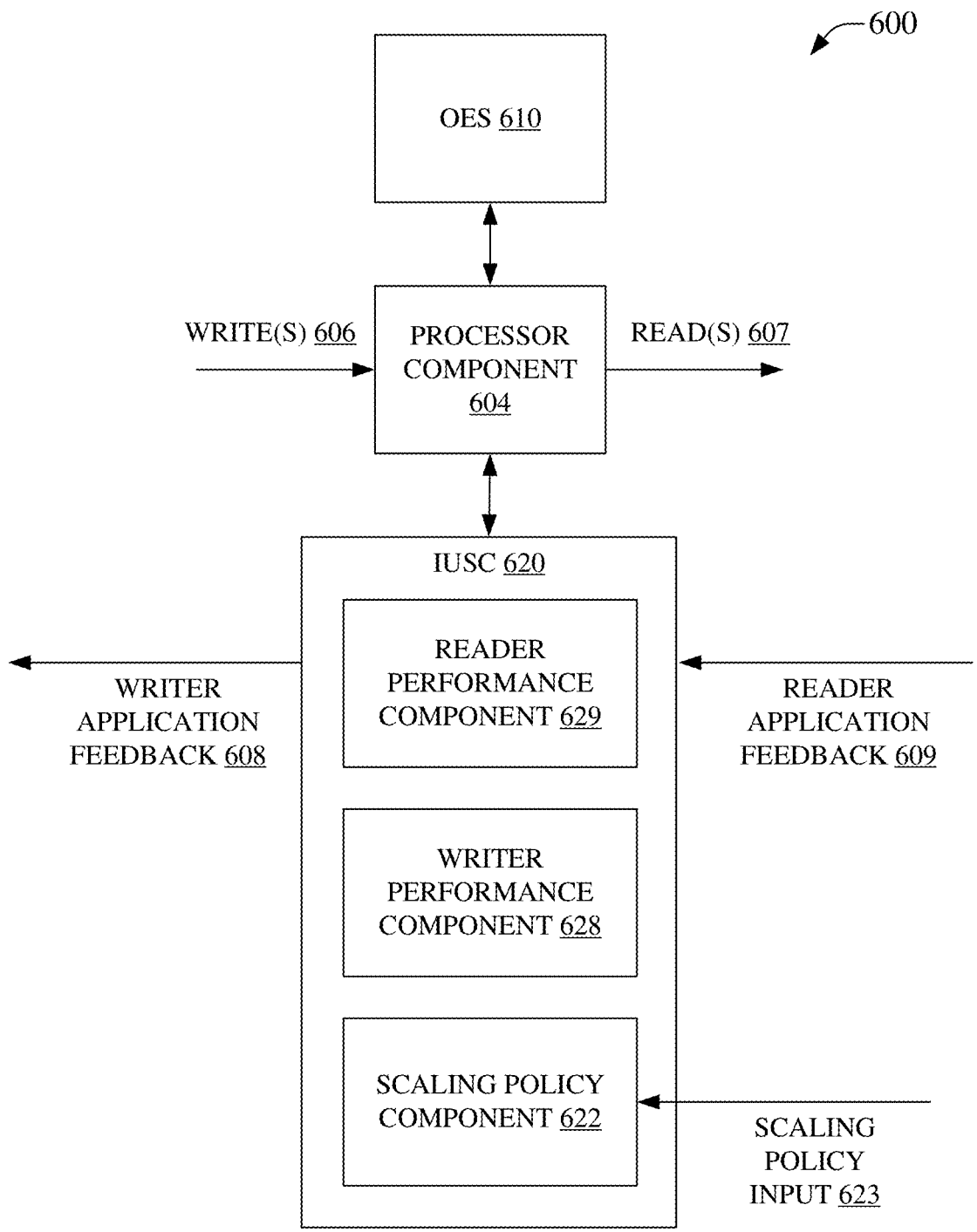
FIG. 6 is an illustration of one example embodiment that can facilitate applying a scaling policy to information-unit scaling of an OES.

FIG. 6 is an illustration of a system 600, which can facilitate applying a scaling policy to information-unit scaling of an OES, in accordance with embodiments of the subject disclosure. System 600 can comprise OES 610 that can store one or more OES events. OES 610 can store events based on write(s) 606 received by processor component 604. OES 610 can facilitate access to stored events as read(s) 607 via processor 604. OES 610 can be stored via an OES data storage system, e.g., example system 100, 300, 400, etc., on a storage component, e.g., storage component 102, etc. Write(s) 606 can be received from a writer application instance. A writer application instance can be embodied in components external to, but in communication with, system 600. Similarly, read(s) 607 can be communicated to a reader application instance, which in some embodiments, can be embodied in components external to, but in communication with, system 600. A writer application instance, hereinafter generally referred to as a writer, or other similar term, can be one or more writer application, e.g., a group of writer applications can be considered a writer application instance. A reader application instance, herein generally referred to as a reader, or other similar term, can be one or more reader application, e.g., a group of reader applications can be considered a reader application instance.

IUSC 620 can interact with processor component 604 of system 600 to facilitate information-based scaling of OES 610 or a portion thereof. IUSC 620 can receive reader application feedback 609. Reader application feedback 609 can indicate an IU metric for one or more reader application instances. As is noted elsewhere herein, a measurement of a burden on computing resources to enable accessing information embodied in an event, e.g., an information-unit metric, can be distinct from a measurement of the size of an event in terms of bits, e.g., a data-unit metric. IUSC 620 can comprise reader performance component 629 that can enable OES scaling based on reader application feedback 609. Reader performance component 629 can determine performance(s) of reader(s) reading from OES 610, or a portion thereof, in terms of IU metrics. Moreover, IUSC 420 can determine writer application feedback 608 based on data to be written to an event, e.g., received via write(s) 606, wherein writer application feedback 608 can enable scaling of OES 610 prior to writing the corresponding event. In this regard, IUSC 620 can comprise writer performance component 628 that can receive event data, e.g., via a portion of event data comprised in write(s) 606, etc., and can determine scaling of OES 610 based on the received event data prior to writing a corresponding event. Writer performance component 628 can therefore determine an IU value for an event prior to writing the event to OES 610. As such, OES 610 can be appropriately scaled based on the determined IU value prior to writing the event. Writer performance component 628 can perform analysis, emulation, simulation, modeling, etc., based on updateable reader information to determine IU values employable in scaling of OES 610 proximate to writing an event. In some embodiments, reader application feedback 609 can indicate which readers, or which types of readers, are reading events from OES 610, and the indication can be employed by writer performance component 628 to select an appropriate model, emulation, simulation, etc., upon which to perform incoming event analysis in relation to scaling OES 610. Moreover, in an embodiment, WPC 628 can perform OES scaling proximate to writing events and RPC 629 can provide supplemental scaling proximate to reading events.

IUSC 620 can comprise scaling policy component 622 that can receive scaling policy input 623. Scaling policy component 622 can determine under what conditions to permit or allow scaling in accord with received scaling policy input 623. As an example, a customer can indicate that specific reader instance is controlling in regard to OES IU-based scaling. In this example, the RPC 629 and/or WPC 628 initiated scaling of OES 610 can be controlled by IU values of the specified reader instance. In another example, scaling policy input 623 can indicate that scaling up is permitted where at least one reader instance indicates scaling up of an OES and that scaling down is permitted where all reader instances indicate scaling down of the OES. In this example, OES 610 can be scaled up when any reader indicates that the IU has transitioned a threshold value, e.g., where even one reader can be overburdened, scaling the OES can be permitted to provide relief. Moreover, in this example, where not all readers indicated that they can scale down, this can indicate that at least one of the readers would be overburdened by a scaling down and the scaling down event can be prohibited until all readers indicate that scaling down is appropriate. Readers can indicate IU values via reader application feedback 609 that can be employed by scaling policy component 622 in conjunction with scaling policy input 623 in determining permission for IUSC 620 to indicate scaling up and/or scaling down of OES 610. Scaling policy considerations can readily apply to scaling proximate to reading events, but can also apply to scaling proximate to writing events, e.g., where modeling of predicted readers indicates that IUs would remain beyond a threshold, then scaling down can be restricted, etc. In all embodiments disclosed herein, heuristics can be applied to scaling events, e.g., scaling up and scaling down can occur in relation to different threshold values, IUs can be required to transition a threshold value for a designated period of time before scaling is permitted, or numerous other rules can be applied to limit or prevent rapid oscillation of OES segment counts, e.g., preventing rapid scale up then scale down then scale up sequence can be achieved via nearly any appropriate application of one or more heuristic techniques.

Figure 7:
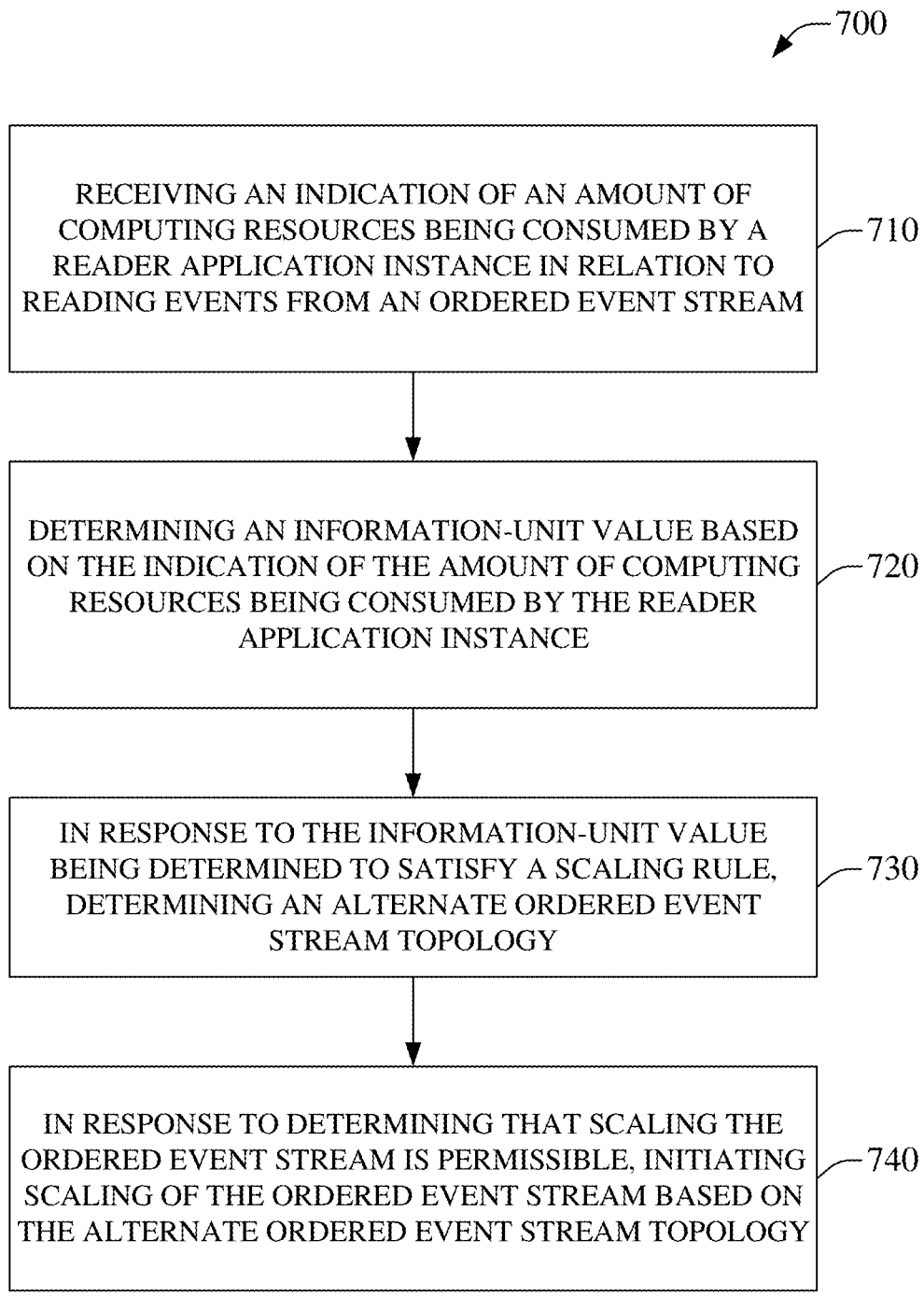
FIG. 7 is an illustration of an example embodiment facilitating information-unit scaling of an OES.
Figure 8:
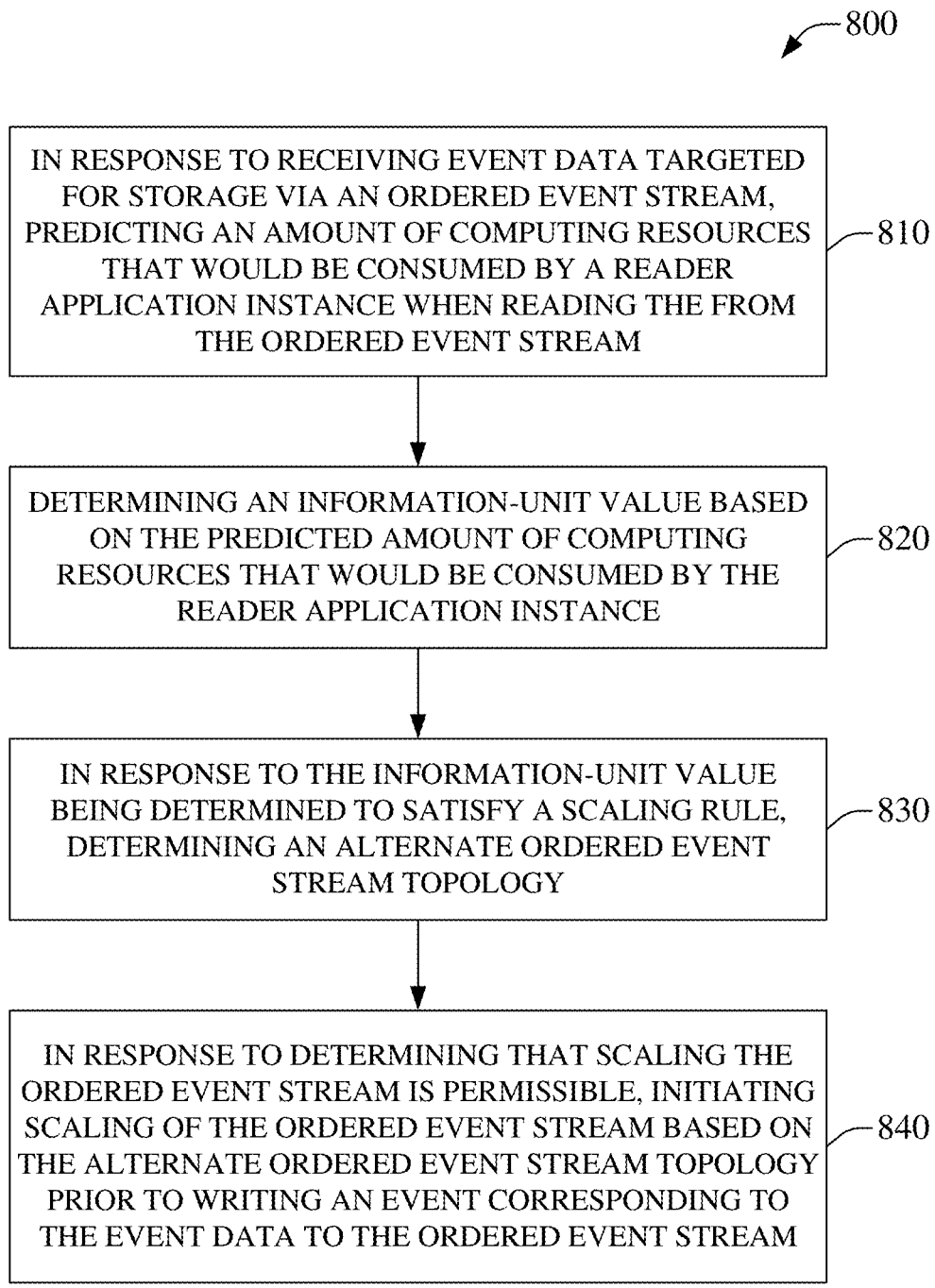
FIG. 8 is an illustration of one example embodiment enabling application of writer feedback to information-unit scaling of an OES.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more embodiments herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, facilitating information-unit scaling of an OES, in accordance with embodiments of the subject disclosure. At 710, method 700 can comprise receiving an indication of an amount of computing resources being consumed by a reader application instance in relation to reading events from an ordered event stream. In this regard, the amount of computing resources being consumed can relate to accessing information embodied in the data of the stream event. This can be contrasted with an amount of computing resources consumed to merely read the data comprising the event itself. As an example, information can be encoded into an amount of data such that accessing the information can comprise reading the data and then decoding the data into the information. In this regard, the amount of computing resources employed to access the information embodied in the data can be different from an amount of computing resources employed to merely read, but not decode, the data itself. Moreover, the same data can produce different information based on undergoing a different data analysis, whereby a first data analysis can employ a different amount of computing resources than a second data analysis. As an example, extracting an average pixel intensity value from an image file can consume a different amount of computing resources than determining a count of faces comprised in the image represented by the image file, which can be a different amount of computing resources than can be employed in determining an identity of a face comprised in an image for the image file. As such, the reader application instance, which can be distinct from, but in communication with, the stream data storage system can consume different amounts of computing resources based on information being extracted from the actual stored bits of the stream event data. Accordingly, the OES can be scaled to provide scaled segments of the OES to reader instances in a manner that can reflect the burden that information extraction is placing on a reader application, e.g., where a reader becomes burdened by extracting information from data, then the OES can be scaled to allow the reader instance to extract data from fewer events and/or additional reader instances can be added to read scaled segments for information extraction, thereby reducing the burden.

At 720, method 700 can comprise determining an IU value based on the indication of the amount of computing resources being consumed by the reader application instance. In an embodiment, the IU value can reflect how burdened the reader is, e.g., not only how many computing resources are being consumed, but how many are being consumed in relation to how many are available, or some other threshold value. As an example, an IU value for a smartphone to extract information from an event can be substantially different from an IU value for a supercomputer performing the same task even though both the smartphone and the supercomputer are consuming a same, or similar, amount of computing resources, e.g., the burden can be expected to be significantly higher for the smartphone than for the supercomputer which can have many more computing resources available to it than would typically be available to the smartphone. In this regard, the information-unit metric can enable normalizing the consumption of computing resources so that the burdening of different reader instances can be effectively compared.

Method 700, at 730, can comprise determining an alternative OES topology in response to the IU value being determined to satisfy a scaling rule. The scaling rule can correspond to a reader indicating transitioning a threshold IU value. In this regard, an uptick in an IU value can be too small to trigger a scaling event, e.g., while more resources can be employed, those resources may not be sufficiently demanding to warrant causing a scaling event. Further, heuristics can be incorporated into the satisfaction of the scaling rule at 730, e.g., an uptick in IU value may need to exist for a designated period before the scaling rule can be satisfied.

At 740 of method 700, scaling of the OES can be initiated in response to determining that the scaling is permissible. The scaling can be in accord with the alternate OES topology determined at 730. At this point method 700 can end. In some embodiments, even where scaling can be desirable and an alternate OES topology can have been determined, the scaling itself can remain unpermitted. As a first example, when scaling down an OES, permission can be attained in response to all reader instances indicating a scaling down, e.g., less than all readers indicating scaling down can result in an unpermitted condition. As a second example, a first reader application can be designated as controlling in regard to scaling an OES, whereby a second reader indicating scaling up would not be associated with permission to initiate the scaling event, but where the first reader indicates scaling, such scaling would be permitted.

FIG. 8 is an illustration of an example method 800, which can enable application of writer feedback to information-unit scaling of an OES, in accordance with embodiments of the subject disclosure. Method 800 can comprise, at 810, predicting an amount of computing resources that would be consumed by a reader application instance when reading the from the ordered event stream. The predicting can be in response to receiving event data targeted for storage via an ordered event stream, e.g., event data comprised in write(s) 106, 306, 406, 506, 606, etc. A prediction of the amount of computing resources that would be consumed can be based on the received event data and an analysis of a model of a reader, emulation of a reader, simulation of a reader, or other predictive mechanism. In this regard, the amount of computing resources that would be consumed can be predicted, and the prediction can correlate to future reader application accessing information from the data once written into an event of the OES. As elsewhere herein, an amount of computing resources employed in accessing information embodied in event data and an amount of event data itself can be different measurements.

At 820, method 800 can comprise determining an IU value based on the predicted amount of computing resources that would be consumed by the reader application instance. In an embodiment, the IU value can reflect how burdened the reader is, e.g., not only how many computing resources are being consumed, but how many are being consumed in relation to how many are available, or some other threshold value. It is noted that more than one IU value can be determined where more than one model of reader application, more than one information result, or some combination thereof is presented. As an example, determining a count of persons in an image can have a first IU value and determining an identity of persons in an image can have a different IU value. To this end, selection of a reader model, emulation, simulation, etc., can be more highly refined than presented herein, although all such reader selection techniques are considered within the scope of the instant disclosure where they lead to determining one or more IU values. The information-unit metric can enable normalizing the consumption of computing resources so that the burdening of different reader instances can be effectively compared.

Method 800, at 830, can comprise determining an alternative OES topology in response to the IU value being determined to satisfy a scaling rule. The scaling rule can correspond to a reader indicating transitioning a threshold IU value. In this regard, an uptick in an IU value can be too small to trigger a scaling event, e.g., while more resources can be employed, those resources may not be sufficiently demanding to warrant causing a scaling event. Further, heuristics can be incorporated into the satisfaction of the scaling rule at 830, e.g., an uptick in IU value may be enforced to exist for a designated period before the scaling rule can be satisfied.

At 840 of method 800, scaling of the OES can be initiated in response to determining that the scaling is permissible. The scaling can be in accord with the alternate OES topology determined at 830. An event can be written to the OES after the corresponding scaling is completed. At this point method 800 can end. In some embodiments, the illustrate scaling proximate to writing an event can be further coupled with subsequent scaling proximate to reading an event. In these embodiments, even where the prediction at 810 can be imperfect, resulting in scaling that can be less than optimal at 840, the performance of actual readers upon reading the OES after 840 can rely on methods like that presented at method 700, to further correctively scale the OES and can therefore compensate for less than perfect predictions at 810.

Figure 9:
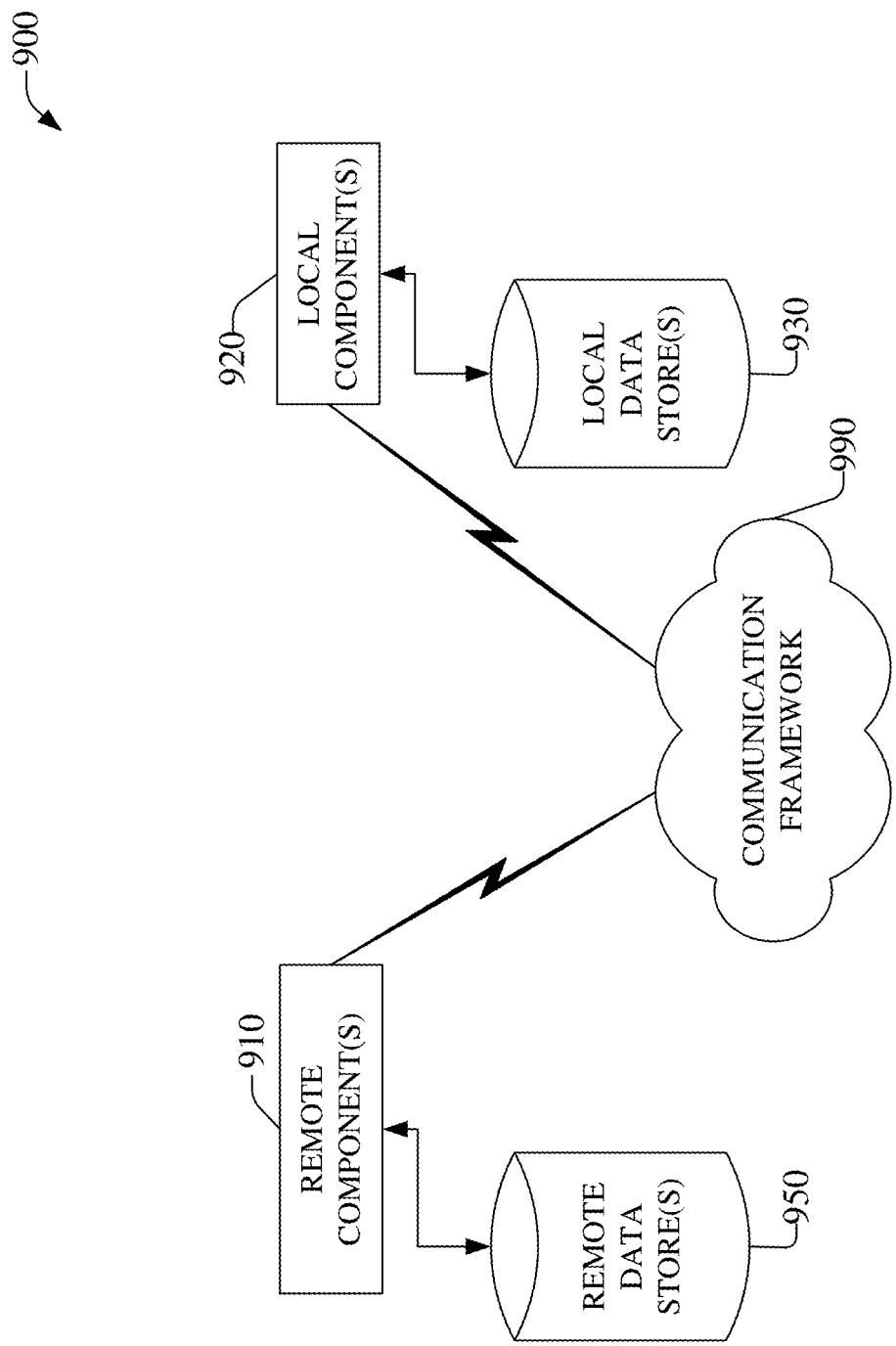
FIG. 9 depicts an example schematic block diagram of a computing environment with which an embodiment of the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, etc., a remotely located processor device comprised in processor component 104, 304, 404, 504, 604, etc., a remotely located device comprised in IUSC 120, 320, 420, 520, 620, etc., reader performance component 329, 529, 629, etc., writer performance component 428, 528, 628, etc., scaling policy component 622, etc., or other remotely located components connected to a local component via communication framework 990. Communication framework 990 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise storage component 102, etc., a locally located processor device comprised in processor component 104, 304, 404, 504, 604, etc., a locally located device comprised in IUSC 120, 320, 420, 520, 620, etc., reader performance component 329, 529, 629, etc., writer performance component 428, 528, 628, etc., scaling policy component 622, etc., or other local components connected to a local component via communication framework 990.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 990. Similarly, local component(s) 920 can be operably connected to one or more local data store(s) 930, that can be employed to store information on the local component(s) 920 side of communication framework 990. As examples, OES scaling data can be communicated from a remotely located component, e.g., IUSC 120, 320, 420, 520, 620, etc., via communication framework 990, to a local component, e.g., processor component 104, 304, 4040, 504, 604, etc., to facilitate scaling an OES, as disclosed herein.

Figure 10:
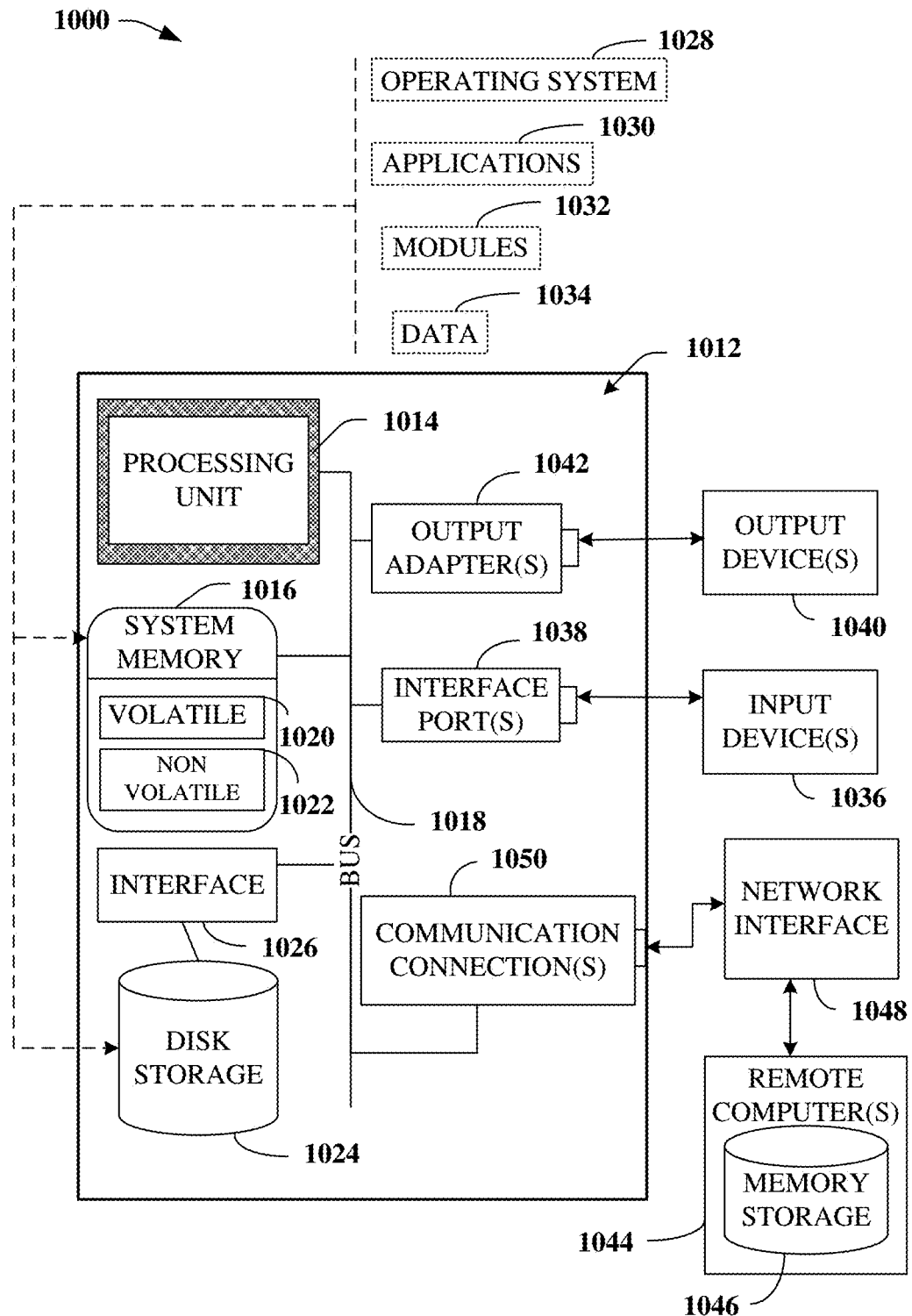
FIG. 10 illustrates an example block diagram of a computing system operable to execute the disclosed systems and methods in accordance with an embodiment.

In order to provide a context for the various embodiments of the disclosed subject matter, FIG. 10, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated embodiments can also be practiced in distributed computing environments where tasks are performed by remote processing devices that are linked through a communications network; however, some if not all features of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, etc., processor component 104, 304, 404, 504, 604, etc., IUSC 120, 320, 420, 520, 620, etc., reader performance component 329, 529, 629, etc., writer performance component 428, 528, 628, etc., scaling policy component 622, etc., or other components disclosed herein, can comprise a processing unit 1014, a system memory 1016, and a system bus 1018. System bus 1018 can couple system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an embodiment, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining a normalized value indicating a level of burden on computing resources corresponding to accessing information embodied in event data of an ordered event stream event, e.g., an IU value. Moreover, in response to determining that a scaling rule has been satisfied based on the normalized value, e.g., the IU value transitions a threshold value, determining an updated topology for the ordered event stream to support scaling the OES. The scaling of the OES can then be performed, where permissible to adapt the OES topology based on the level of computing resource burden indicated via the IU value.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has characteristic A and a second embodiment that has characteristic B does not preclude a third embodiment that has characteristic A and characteristic B. The use of granular examples and embodiments is intended to simplify understanding of certain features, characteristics, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Characteristics, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer," or "inference," can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor perform operations comprising:
   receiving a value indicating a predicted level of burden on computing resources of the system corresponding to a reader application instance reading information embodied in event data of an ordered event stream (OES) to be written to a storage device of the system, wherein the value is based on predicted performance data of a simulation of the reader application instance exceeding a threshold;
   updating a topology of a key space of the OES, wherein the updating reduces the predicted level of burden on the computing resources, and wherein the updating is permitted based on a condition being satisfied;
   scaling the OES based on the updated topology; and
   writing the scaled OES to the storage device, wherein the information embodied in the event data of the OES is read by the reader application instance.

2. The system of claim 1, wherein the scaling is a scaling up of the OES, and wherein the reader application instance is one of a plurality of reader application instances.

3. The system of claim 1, wherein the scaling is a scaling down of the OES, and wherein the condition is satisfied when values for every reader application instance of a plurality of reader application instances satisfy a rule.

4. The system of claim 1, wherein the reader application instance is in communication with, but is not executing on, a component comprised in the system.

5. The system of claim 1, wherein the event data of the OES is received from a writer application instance.

6. The system of claim 5, wherein the operations further comprise performing, in response to receiving a future event reading operation from the reader application instance, performing a supplemental scaling of the OES based on feedback from the reader application instance.

7. The system of claim 5, wherein the writer application instance is in communication with, but is not executing on, a component comprised in the system.

8. The system of claim 1, wherein a division of the OES into at least two segments is based on the updated topology.

9. The system of claim 1, wherein a merging of the OES with another OES is based on the updated topology.

10. A method, comprising:
    receiving, by a system comprising a processor, a normalized value indicating a predicted level of burden on computing resources of the system corresponding to a reader application instance reading information embodied in event data of an ordered event stream (OES) to be written in a storage device of the system, wherein the value is based on predicted performance data of a simulation of the reader application instance exceeding a threshold;
    updating a key space topology corresponding to the OES, wherein the updating reduces the predicted level of burden on the computing resources, and wherein the updating is permitted based on a condition being satisfied;
    scaling the OES based on the updated topology; and
    writing the scaled OES to the storage device, wherein the information embodied in the event data of the OES is read by the reader application instance.

11. The method of claim 10, wherein the normalized value is further based on receiving reader application instance feedback corresponding to the reader application instance reading the OES.

12. The method of claim 11, wherein the reader application instance feedback is received from a reader application instance that is executed via another system.

13. The method of claim 10, wherein the normalized value is further based on receiving, by the system, the event data from a writer application instance prior to writing the event data to the OES and a model of the reader application instance.

14. The method of claim 13, wherein the event data is appended to the terminus of the OES.

15. The method of claim 13, wherein the writer application instance is executed via a second system other than the system.

16. A non-transitory machine-readable medium, comprising executable instructions that, when executed by a processor of a system perform operations comprising:
receiving, by the system, a normalized value indicating a predicted level of burden on computing resources of the system corresponding to a reader application instance reading information embodied in event data of an ordered event stream (OES) to be written to a storage device of the system, wherein the value is based on predicted performance data of a simulation of the reader application instance exceeding a threshold;
updating a topology for a key space of the OES, wherein the updating reduces the predicted level of burden on the computing resources, and wherein the updating is permitted based on a condition being satisfied;
scaling the OES based on the updated topology; and
writing the scaled OES to the storage device, wherein the information embodied in the event data of the OES is read by the reader application instance.

17. The non-transitory machine-readable medium of claim 16, wherein the normalized value is further based on reader application instance feedback corresponding to the reader application instance reading the OES.

18. The non-transitory machine-readable medium of claim 17, wherein the reader application instance feedback is received from a reader application instance that is executed via another system.

19. The non-transitory machine-readable medium of claim 16, wherein the event data is received from a writer application instance.

20. The non-transitory machine-readable medium of claim 19, wherein the writer application instance is executed via a second system other than the system.

\* \* \* \* \*